United States Patent
Dice et al.

(10) Patent No.: US 11,914,996 B2
(45) Date of Patent: Feb. 27, 2024

(54) TICKET LOCKS WITH ENHANCED WAITING

(71) Applicant: Oracle International Corporation, Redwood City, CA (US)

(72) Inventors: David Dice, Foxboro, MA (US); Alex Kogan, Needham, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 17/817,854

(22) Filed: Aug. 5, 2022

(65) Prior Publication Data
US 2022/0374287 A1    Nov. 24, 2022

Related U.S. Application Data

(63) Continuation of application No. 16/572,532, filed on Sep. 16, 2019, now Pat. No. 11,442,730.
(Continued)

(51) Int. Cl.
*G06F 12/00*    (2006.01)
*G06F 9/30*    (2018.01)
(Continued)

(52) U.S. Cl.
CPC .......... *G06F 9/3009* (2013.01); *G06F 9/3802* (2013.01); *G06F 9/52* (2013.01);
(Continued)

(58) Field of Classification Search
CPC ...... G06F 9/3009; G06F 9/30087; G06F 9/52; G06F 9/526; G06F 9/528; G06F 12/0802;
(Continued)

(56) References Cited

U.S. PATENT DOCUMENTS

| 8,434,082 B2 | 4/2013 | Bliss |
| 9,158,596 B2 | 10/2015 | Dice |

(Continued)

FOREIGN PATENT DOCUMENTS

| GB | 2532424 | 5/2016 |

OTHER PUBLICATIONS

Oracle, "SPARC T7-2 Server", Oracle Data Sheet, Copyright 2018, pp. 1-5.
(Continued)

*Primary Examiner* — Shawn X Gu
(74) *Attorney, Agent, or Firm* — Robert C. Kowert; Kowert, Hood, Munyon, Rankin & Goetzel, P.C.

(57) ABSTRACT

A computer comprising one or more processors and memory may implement multiple threads that perform a lock operation using a data structure comprising an allocation field and a grant field. Upon entry to a lock operation, a thread allocates a ticket by atomically copying a ticket value contained in the allocation field and incrementing the allocation field. The thread compares the allocated ticket to the grant field. If they are unequal, the thread determines a number of waiting threads. If the number is above the threshold, the thread enters a long term wait operation comprising determining a location for long term wait value and waiting on changes to that value. If the number is below the threshold or the long term wait operation is complete, the thread waits for the grant value to equal the ticket to indicate that the lock is allocated.

20 Claims, 7 Drawing Sheets

Related U.S. Application Data

(60) Provisional application No. 62/734,687, filed on Sep. 21, 2018.

(51) Int. Cl.
  *G06F 12/0802* (2016.01)
  *G06F 9/52* (2006.01)
  *G06F 13/16* (2006.01)
  *G06F 9/38* (2018.01)

(52) U.S. Cl.
  CPC .......... *G06F 9/526* (2013.01); *G06F 12/0802* (2013.01); *G06F 13/1663* (2013.01); *G06F 13/1689* (2013.01); *G06F 2212/60* (2013.01)

(58) Field of Classification Search
  CPC ............... G06F 12/084; G06F 2212/60; G06F 13/1663; G06F 13/1689
  See application file for complete search history.

(56) References Cited

U.S. PATENT DOCUMENTS

| | | | | |
|---|---|---|---|---|
| 10,592,281 | B1 * | 3/2020 | Saidi | ........... G06F 9/4881 |
| 2003/0200457 | A1 | 10/2003 | Auslander et al. | |
| 2007/0300226 | A1 | 12/2007 | Bliss | |
| 2014/0351231 | A1 | 11/2014 | McKenney | |

OTHER PUBLICATIONS

John M. Mellor-Crummey, et al, "Algorithms for Scalable Synchronization on Shared-Memory Mutliprocessors", ACM Trans. on Compurt Systems, Jan. 1991, pp. 1-42.

Dave Dice, "Malthusian Locks", arXiv:1511.06035v7, Jun. 9, 2017, pp. 1-21.

Beng-Hong Lim, "Reactive Synchronization Algorithms for Multiprocessors", ACM, vol. 29, No. 11, 1994, pp. 1-162.

Dave Dice, "Brief Announcement: A Partitioned Ticket Lock", SPAA'11, ACM, Jun. 4-6, 2011, pp. 309-310.

Vitalii Aksenov, et al., "Brief Announcement: Performance Prediction for Coarse-Grained Locking", Retrieved from https://hal.inria.fr/hal-01887733, Oct. 4, 2018, pp. 1-4.

J.R. Goodman, et al., "MESIF: A Two-Hip Cache Coherency Protocol for Point-to-Point Interconnects", Nov. 19, 2004, 27th International Symposium on Computer Architecture, pp. 1-22.

Tudor David, et al, "Everything You Always Wanted to Know About Synchronization but Were Afraid to Ask", ACM, SOSP'13, Nov. 3-6, 2013, pp. 1-16.

Michael J. Fischer, et al, "Resource Allocation with Immunity to Limited Process Failure (Preliminary Report)", IEEE, dated 1979, pp. 234-254.

Stijn Eyerman, et al., "Modeling Critical Sections in Amdahl's Law and its Implications for Multicore Design", ACM, ISCA'10, Jun. 19-23, 2010, 9 Pages.

Jelena Antic, et al., "Locking Made Easy", Middleware '16, Dec. 12-16, 2016, Retrieved from http://dx.doi.org/10.1145/2988336.2988357, 14 Pages.

Phuong Hoai Ha, et al, "Reactive Spin-locks: A Self-tunning Approach", Technical Report No. 2005:16, Department of Computing Science and Engineering Division of Computing Science, Chalmers University of Technology and Goteborg University, Sep. 2005, 14 Pages.

Unknown, "Proceedings of the Linux Symposium", Jul. 11-13, 2012, 154 Pages.

David Dice, et al., "Lock Cohorting: A General Technique for Designing NUMA Locks", ACM, PPoPP'12, Feb. 25-29, 2012, 10 Pages.

* cited by examiner

TICKET LOCKS WITH ENHANCED WAITING

This application is a continuation of U.S. patent application Ser. No. 16/572,532, filed Sep. 16, 2019, which claims priority to U.S. Provisional Application No. 62/734,687 filed Sep. 21, 2018, which are herein incorporated by reference in their entirety.

FIELD OF THE DISCLOSURE

This disclosure relates generally to concurrent programming, and more particularly to systems and methods for performing concurrent synchronization using software lock operations.

DESCRIPTION OF THE RELATED ART

Modern computer systems conventionally include the ability to perform multiple threads of execution simultaneously, thus giving rise to the need to synchronize threads for access to shared data structures. Among these synchronization mechanisms is the lock operation. When using locks, data structures shared among multiple threads have an associated lock and, to access the shared data structure, a thread must first obtain the lock then release the lock once access is complete. Threads which attempt to obtain the lock while it is currently allocated to another thread must wait for the lock to become available.

Different approaches are used to implement such locking operations, among them is the ticket lock which includes a lock structure consisting of ticket and grant fields. Using a ticket lock, threads desiring to obtain the lock first allocate a ticket by atomically copying the ticket value from the lock structure and incrementing the ticket value in the lock structure. After the thread's ticket is allocated, the thread simply waits until the grant field of the lock structure equals the thread's ticket, indicating that the lock is allocated to the thread. Once the thread no longer needs the lock, it releases the lock by incrementing the grant field, which may indicate to another waiting thread that it has been allocated the lock.

The simple design of the ticket lock leads to efficient implementations resulting in low latencies in acquiring the lock, low latencies in the transfer of lock ownership from one thread to the next and allocation fairness for all threads. The ticket lock algorithm, however, suffers poor scalability when significant numbers of threads wait for the lock due to all threads waiting on the shared grant field causing significant memory contention when lock ownership is transferred. Other lock algorithms that provide similar fairness guarantees, such as the Mellor-Crummey and Scott, or MCS, lock address this issue to provide better scalability under higher thread contention, but these algorithms introduce additional complexity which increases latency in lock acquisition in periods of low contention. What is needed, then, is a locking operation which combines the simplicity and low latency of the ticket lock under low contention with the scalability benefits of other lock operations under periods of high lock contention.

SUMMARY

Methods, techniques and systems for providing efficient ticket locks with improved allocation waiting are described. These various embodiments of an enhanced ticket lock operation include the basic implementation of ticket locks, including a lock structure comprising ticket and grant fields and identical operation during periods of no or low contention for the lock, leading to the same low latency benefits of classic ticket lock operation. The various embodiments of an enhanced ticket lock operation also include the addition of one or more secondary wait variables; when a thread executing an enhanced ticket lock operation determines that it must enter a long term waiting operation due to lock contention, it determines a wait location to monitor for indication of long term wait completion. In doing so, contention for the shared grant field of the lock structure is substantially reduced or eliminated. By reducing contention of the grant field, the enhanced ticket lock operation substantially improves the high contention scalability of the ticket lock algorithm while preserving the low contention performance and fairness of the classic ticket lock.

Figure 1:
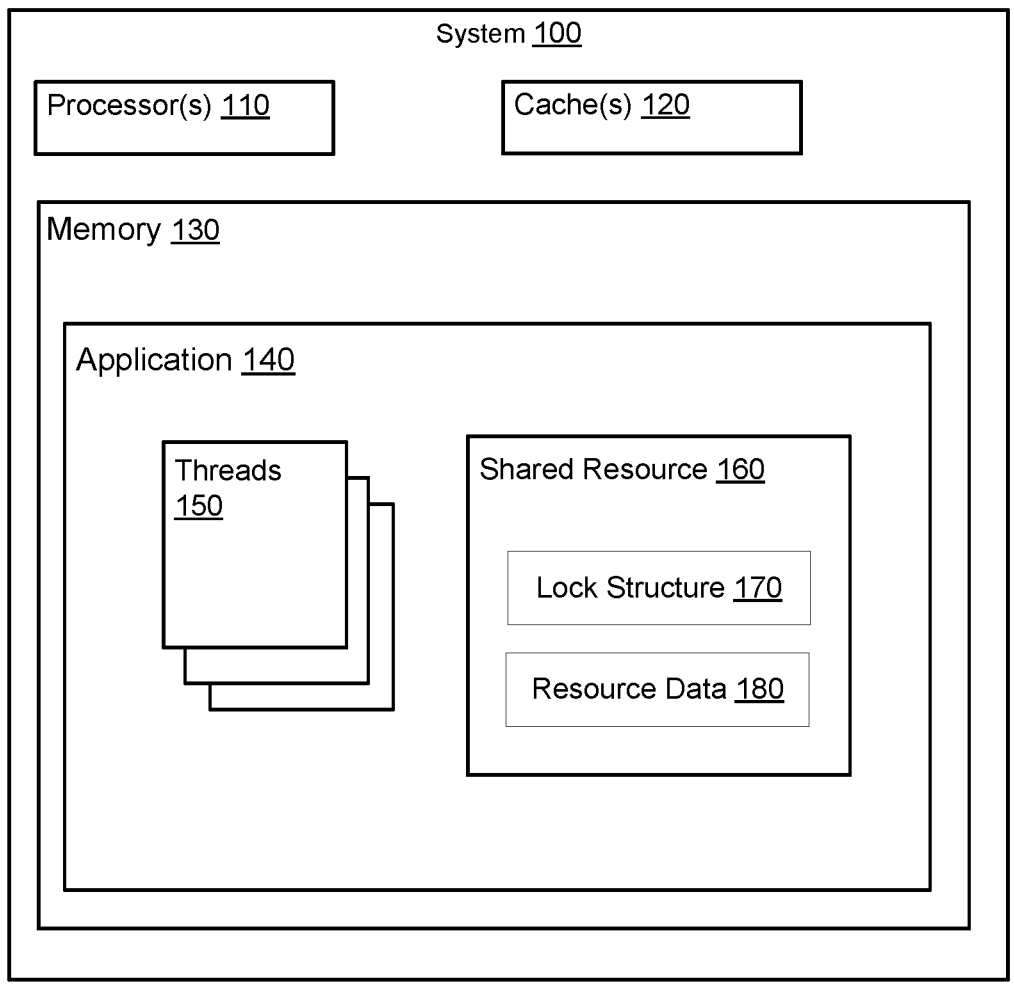
FIG. 1 is a block diagram illustrating a system implementing an application execution environment including multiple threads sharing a resource through the use of ticket locks.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

A ticket lock operation is a synchronization primitive for multi-threaded applications that employs a software lock in combination with an allocation strategy that ensures fairness. The ticket lock includes a lock structure consisting of ticket and grant fields. Using a ticket lock, threads desiring to obtain the lock first allocate a ticket by atomically copying a ticket value from the lock structure and incrementing the ticket value in the lock structure. After the ticket is allocated, the thread waits until the grant field of the lock structure equals the allocated ticket value, indicating that the lock is allocated to the thread. Once the thread no longer needs the lock, it releases the lock by incrementing the grant field, which may indicate to another waiting thread that it has been allocated the lock.

Various embodiments of the present invention extend the above ticket lock operation to use one or more wait variables for use by threads that have determined that they require long term wait operations. These one or more wait variables may be private to a particular lock or shared among multiple locks and may be statically sized dependent on anticipated workloads or may be sized in proportion to the number of processors in the host system.

Once a ticket has been allocated and the thread has determined that the lock is not yet available, the thread makes an additional determination whether a long term wait is required by determining if the number of threads already waiting on the lock exceeds a predetermined threshold. If the threshold is not exceeded, the thread proceeds in the same manner as in a conventional ticket lock, but if the threshold is exceeded the thread implements a long term wait using a separate wait variable rather than waiting on the grant field. In doing so, contention for the grant field is reduced or eliminated without increasing latency for low-contention conditions.

FIG. 1 is a block diagram illustrating a system implementing an application execution environment including multiple threads sharing a resource through the use of ticket locks. The System 100 includes one or more Processors 110 capable executing multiple parallel threads of execution coupled through one or more Caches 120 to a Memory 130 that includes an Application 140. The Application 140 may include multiple executing Threads 150 that access a Shared Resource 160. The Shared Resource 160 includes a controlling Lock Structure 170 and Resource Data 180 sharable by the Threads 150. To access Resource Data 180 of the Shared Resource 160, one of the Threads 150 must first allocate the Shared Resource 160 using the Lock Structure 170. Once the Shared Resource 160 is allocated, the Thread 150 may access the Resource Data 180 and when the Thread no longer requires access to the Shared Resource 160, the Thread 150 may release the Shared Resource 160 using the Lock Structure 170. While FIG. 1 shows a single application with three executing threads and one shared resource, this example is not intended to be limiting and any number of applications with any number of threads sharing any number of resources may be envisioned.

Figure 2:
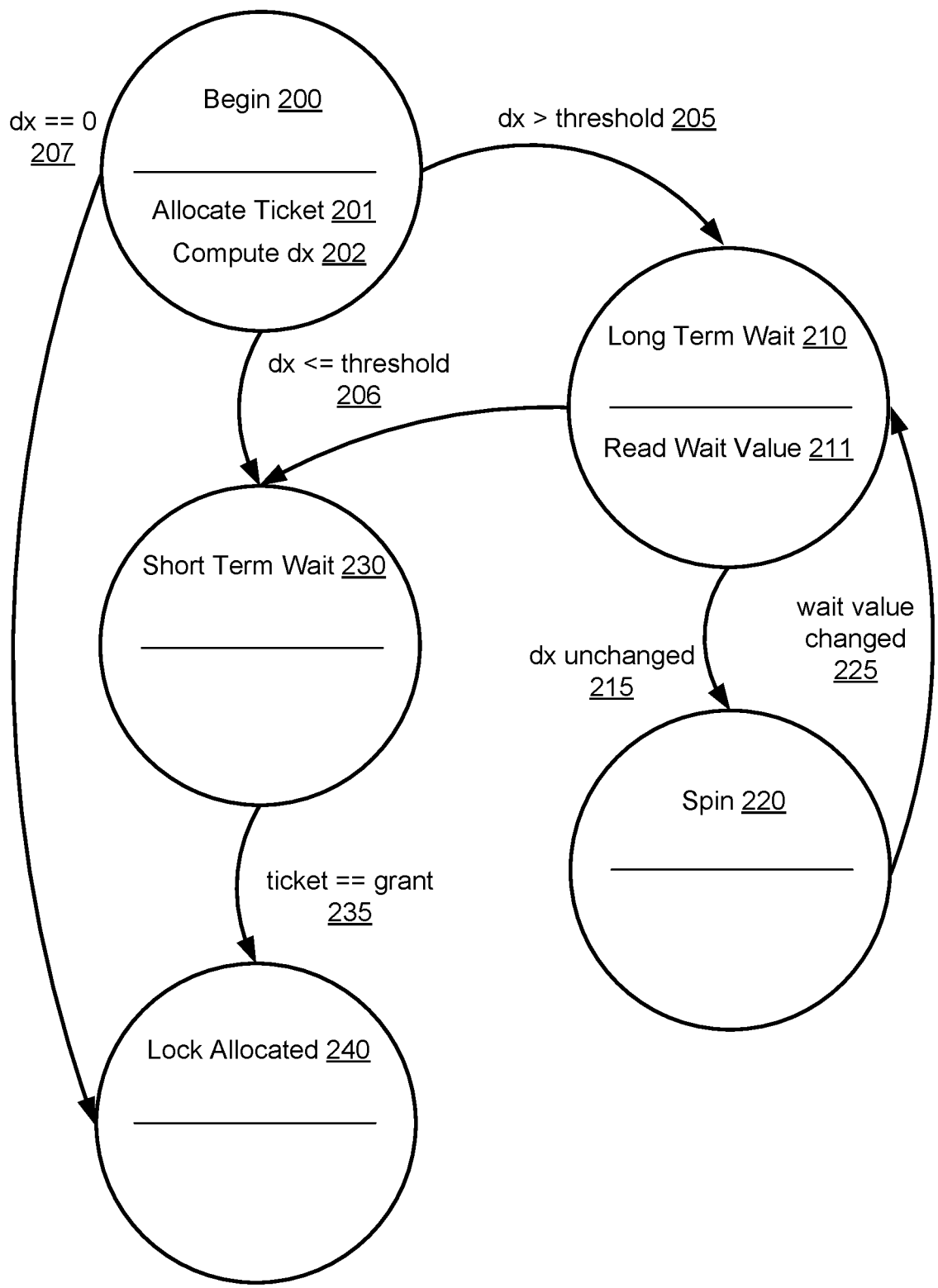
FIG. 2 is a state diagram illustrating one embodiment of a method for implementing a ticket lock operation augmented with a wait array.
Figure 3:
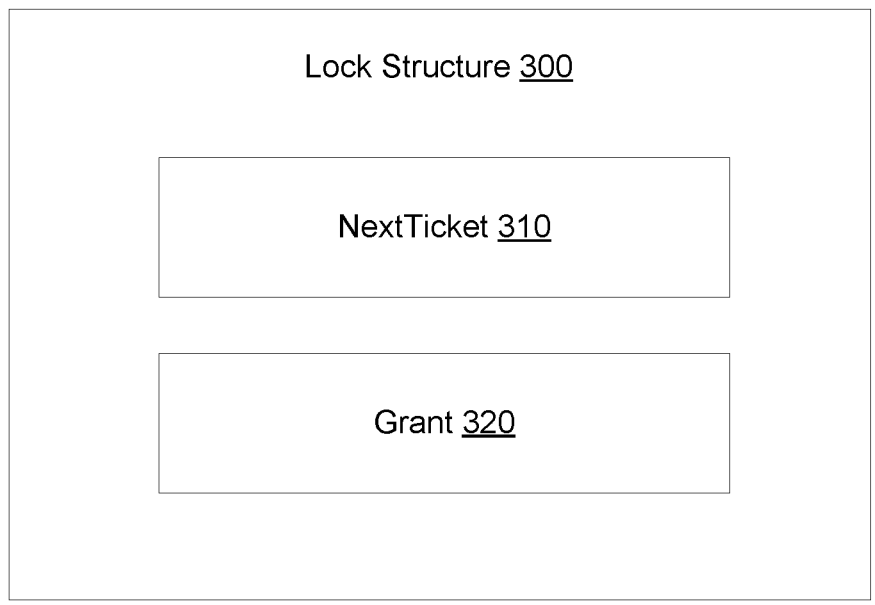
FIG. 3 is a diagram illustrating the lock data structure used in one embodiment.

FIG. 2 is a state diagram illustrating an enhanced ticket lock operation according to some embodiments. A lock desired to be allocated by a thread may be described in by a lock structure 300 as shown in FIG. 3. This lock structure 300 includes two unsigned integer fields, a NextTicket field 310 and a Grant field 320. Initially, these two fields will be assigned equal values, typically zero, where equal values indicate that the lock is currently unallocated. When a thread allocates a ticket, it increments the NextTicket 310 field and assumes a ticket value equal to the NextTicket field 310 before the increment operation. Once this occurs, the NextTicket field 310 contains a value higher than the Grant field 320 indicating that the lock is allocated to the thread whose ticket value equals the Grant field 320 value. When the thread desires to release the lock, it increments the Grant field 320, indicating that either another thread is allocated the lock or that the lock is free, depending on the value of the NextTicket field 310. In this example, the NextTicket 310 and Grant 320 fields are monotonically increasing, except during integer overflows, by virtue of only being modified by increment operations. This means that the NextTicket 320 value is always greater than or equal to the Grant 320 value and the difference of these values is always non-negative. Those of ordinary skill in the art, however, will understand that this convention is only one of a number conventions that may be employed. For example, the NextTicket 310 and Grant 320 fields may each only be decremented resulting in monotonically decreasing values and ticket values less than or equal to the Grant field. Other conventions may also be employed and it should be understood that the conventions described above are not intended to be limiting.

A thread which desires to allocate a lock starts at the Begin state 200. In the Begin state 200, the thread first allocates a Ticket 201 by performing an atomic increment operation on the NextTicket field 310 of the desired lock. This may be performed using an atomic increment primitive, or instruction, that is a feature of many modem processor architectures. The atomic increment primitive loads the current value of a memory location, in this case the NextTicket field 310, increments the value contained in the memory location, and returns the value loaded which becomes the Ticket value for the thread. It should be understood, however, that an atomic increment primitive is not the only instruction usable to allocate the Ticket 201 and that any form of atomic update may also be used, particularly in computer architectures that don't directly provide an atomic increment primitive. Next, a number of waiting threads, dx, is computed in step 202. This value is simply one less than the difference between the allocated Ticket and the Grant field 320 and is a non-negative value representing the current number of waiting threads. If this value is zero (transition 207), then the thread has determined that the lock is allocated to the thread and execution proceeds to the Lock Allocated state 240. Alternatively, the allocated ticket may be directly compared to the Grant field 320 and, if equal, execution proceeds to the Lock Allocated state 240.

If it is determined that the lock is not yet allocated to the thread, then the number of waiting threads, dx, is computed if not already computed in step 201, and compared to a predetermined threshold. If the number of waiting threads is not above the threshold (transition 206), execution proceeds to Short Term Wait state 230. In the Short Term Wait state 230, the thread waits for the Grant field 320 to become equal to the allocated Ticket value. Once they are equal (transition 235) execution proceeds to the Lock Allocated state 240. If, however, the number of waiting threads exceeds the threshold (transition 205), execution proceeds to Long Term Wait state 210.

Once executing the Long Term Wait state 210, the thread first determines a memory location for a wait variable in step 211 on which to wait for completion of a long term wait operation. This determination may be implemented by means of one or more hash operations to compute the effective element of one or more arrays of memory variables. The hash operation may be performed on the allocated ticket value, alone or in combination with other information related to the lock. In some embodiments, the hash may comprise simple modulo operations dependent on the sizes of the one or more waiting arrays with these modulo operations performed on the ticket value itself, alone or as modified by other lock information. In other embodiments, the ticket value may first be modified so as to enable the hash to distribute consecutive ticket values among unique cache lines. For example, the ticket value may first be scaled by a prime number selected to be close to the size of a cache line of the underlying computer architecture. Any number of hash computations or other determination technique may also be employed and it should be understood that the hash computations described above are not intended to be limiting. Furthermore, the determination of the wait variable may be performed on entry to Long Term Wait state 210 during the transition 205 rather than each time the Long Term Wait state is entered, thus reducing the number of computations required during the long term wait operation of the thread.

Once the wait variable is determined, an initial value of the wait variable is read in step 211. After this value is read, the number of waiting threads, dx, is computed again in step 212 and, if the number of waiting threads remains above the threshold (transition 215), execution proceeds to Spin state 220 where the thread waits for the wait variable value determined in step 211 and loaded in step 211 to change. Once the wait value changes, execute returns to the Long Term Wait state 210. If, instead, the number of waiting threads is not above the threshold (transition 216), execution proceeds to Short Term Wait state 230. In the Short Term Wait state 230, the thread reads the Grant Field 231. Once the Grant field 320 to become equal to the allocated Ticket value. Once they are equal (transition 235) execution proceeds to the Lock Allocated state 240.

Figure 4:
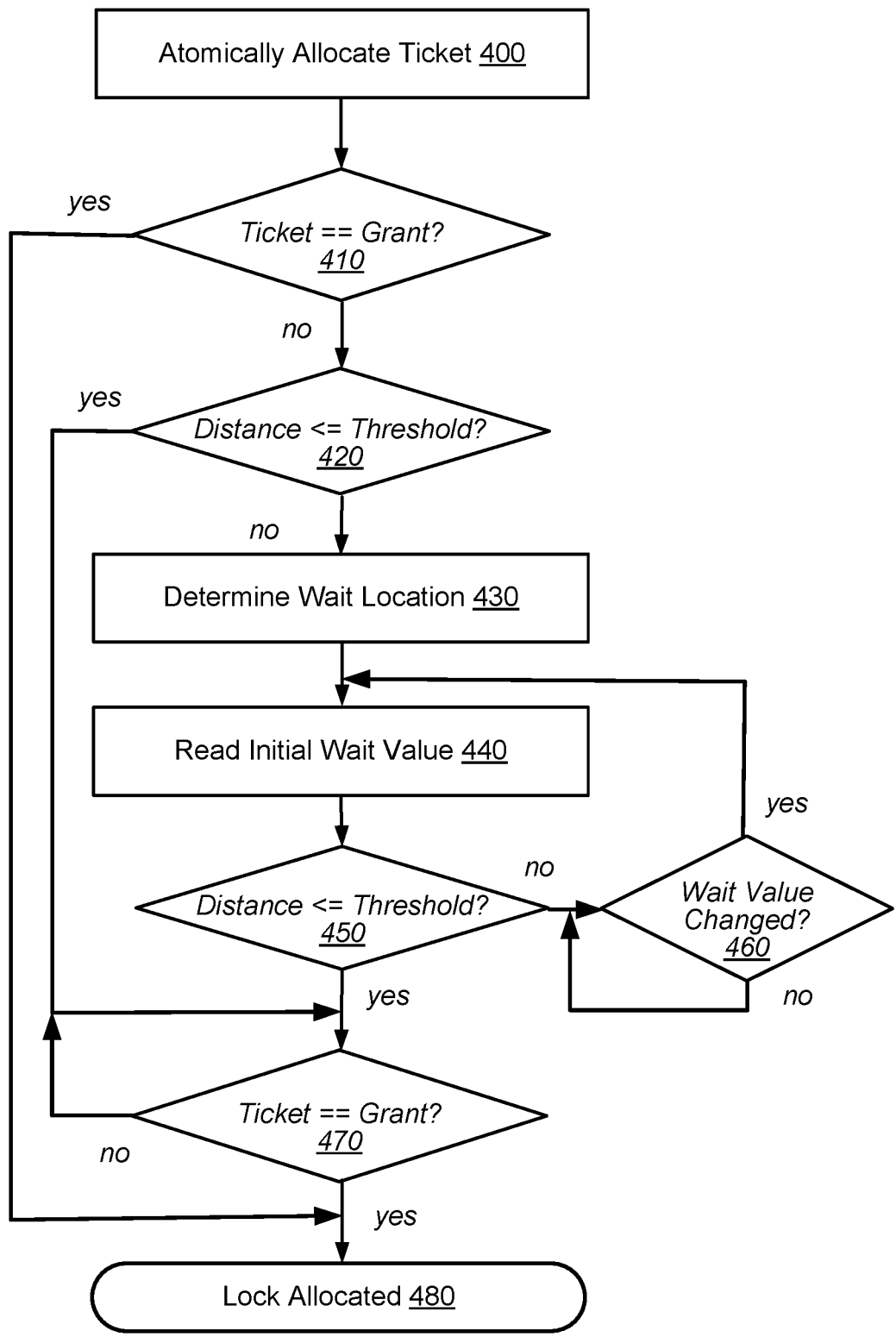
FIG. 4 is a flow diagram illustrating one embodiment of a method for implementing a ticket lock operation augmented with a wait array.

FIG. 4 is a state diagram illustrating an enhanced ticket lock operation according to some embodiments. A thread which desires to allocate a lock starts with allocating a Ticket 400 by performing an atomic increment operation on the NextTicket field 310 of the desired lock as discussed earlier in step 201 of Begin state 200 in FIG. 2. Next, the allocated ticket is compared to the Grant field 320 and, if equal, execution proceeds to the Lock Allocated state 480. If the allocated ticket is not equal to the Grant field 320, however, a number of waiting threads, dx, is computed and compared to a predetermined threshold 420. If the number of waiting threads is not above the threshold, execution proceeds to step 470 where the thread waits for the Grant field 320 to become equal to the allocated Ticket value. Once they are equal execution proceeds to the Lock Allocated state 480.

If, however, the number of waiting threads exceeds the threshold, execution proceeds to step 430 where the thread determines a memory location for a wait variable as discussed above in step 211 of the Long Term Wait state 210 in FIG. 2. Once the wait variable is determined, an initial value of the wait variable is read in step 440. After this value is read, the number of waiting threads, dx, is computed again in step 450 and, if the number of waiting threads remains above the threshold, execution proceeds to step 460 where the thread waits for the wait variable value to change. Once the wait value changes, execute returns to step 440. If, instead, the number of waiting threads is not above the threshold, execution proceeds to step 470 where the thread waits for the Grant field 320 to become equal to the allocated Ticket value. Once they are equal execution proceeds to the Lock Allocated state 480.

Figure 5:
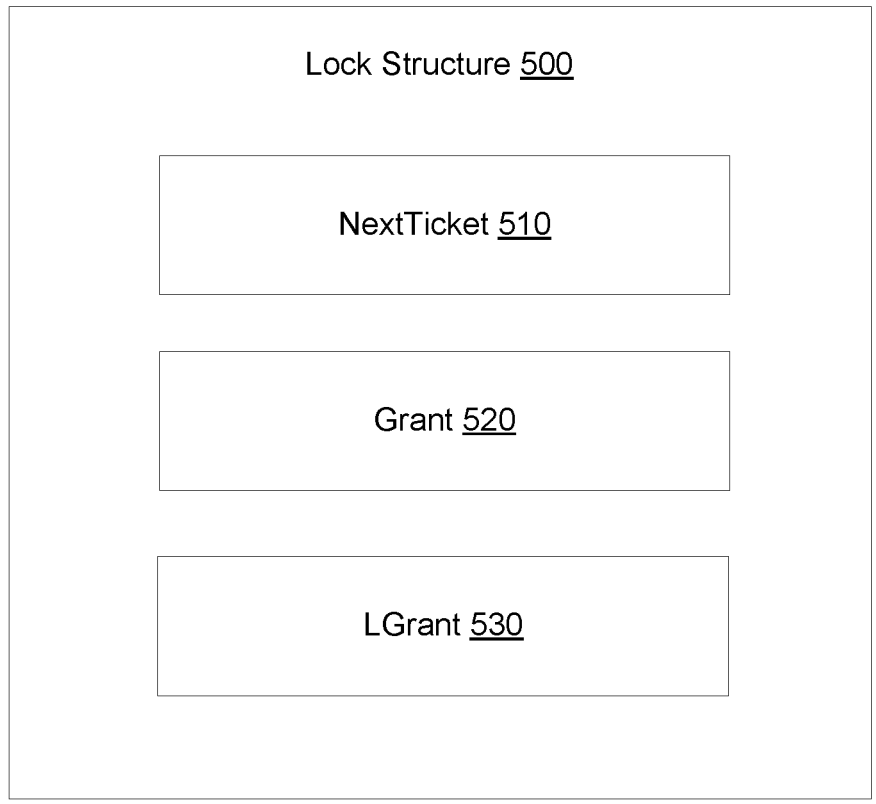
FIG. 5 is a diagram illustrating the lock data structure used in another embodiment.

FIG. 5 is a diagram illustrating the lock data structure 500 used in other embodiments of an enhanced ticket lock operation. This lock structure includes three unsigned integer fields, a NextTicket field 510, a Grant field 520 and an LGrant field 530. The Grant field 520 and the LGrant field 530 may be organized such that the fields are associated with different cache lines in some embodiments. The NextTicket field 510 and Grant field 520 are analogous to the respective fields of the lock data structure 300 as describe above for FIG. 3 while the LGrant field 530 contains a value which tracks the Grant field 520 but is updated separately. When a thread desires to release the lock, it increments the Grant field 520, indicating that either another thread is allocated the lock or that the lock is free, depending on the value of the NextTicket field 510, but additionally performs an atomic increment of the LGrant field 530 subsequent to the incrementing of the Grant field 520. By providing separate Grant and LGrant fields, the number of threads waiting on a change of the Grant field can be minimized with long term waiting threads instead accessing the LGrant field.

Figure 6:
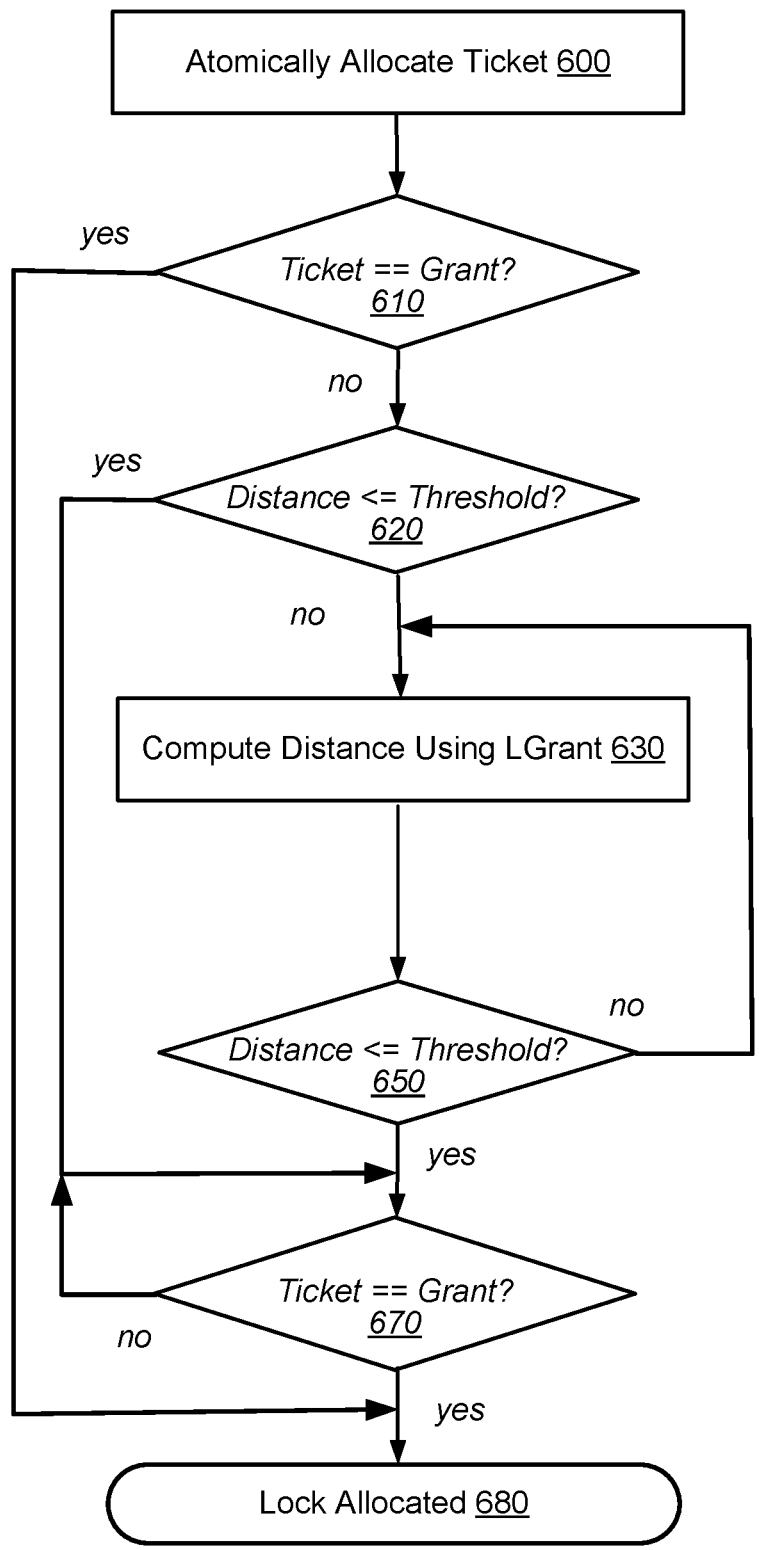
FIG. 6 is a flow diagram illustrating another embodiment of a method for implementing a ticket lock operation augmented with a long term grant field.

FIG. 6 is a state diagram illustrating an enhanced ticket lock operation using a second Grant field according to some embodiments. A thread which desires to allocate a lock starts with allocating a Ticket 600 by performing an atomic increment operation on the NextTicket field 510 of the desired lock as discussed earlier in step 400 of FIG. 4. Next, the allocated ticket is compared to the Grant field 520 and, if equal, execution proceeds to the Lock Allocated state 680. If the allocated ticket is not equal to the Grant field 520, however, a number of waiting threads, dx, is computed and compared to a predetermined threshold 620. If the number of waiting threads is not above the threshold, execution proceeds to step 670 where the thread waits for the Grant field 520 to become equal to the allocated Ticket value. Once they are equal execution proceeds to the Lock Allocated state 680.

If, however, the number of waiting threads exceeds the threshold, execution proceeds to step 630 where the thread computes a number of waiting threads, dx, using the LGrant field 530 rather than the Grant field 520. If the number of waiting threads remains above the threshold in step 650, execution returns to step 630. If, instead, the number of waiting threads is not above the threshold, execution proceeds to step 670 where the thread waits for the Grant field 520 to become equal to the allocated Ticket value. Once they are equal execution proceeds to the Lock Allocated state 680.

Some of the mechanisms described herein may be provided as a computer program product, or software, that may include a non-transitory, computer-readable storage medium having stored thereon instructions which may be used to program a computer system 700 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Figure 7:
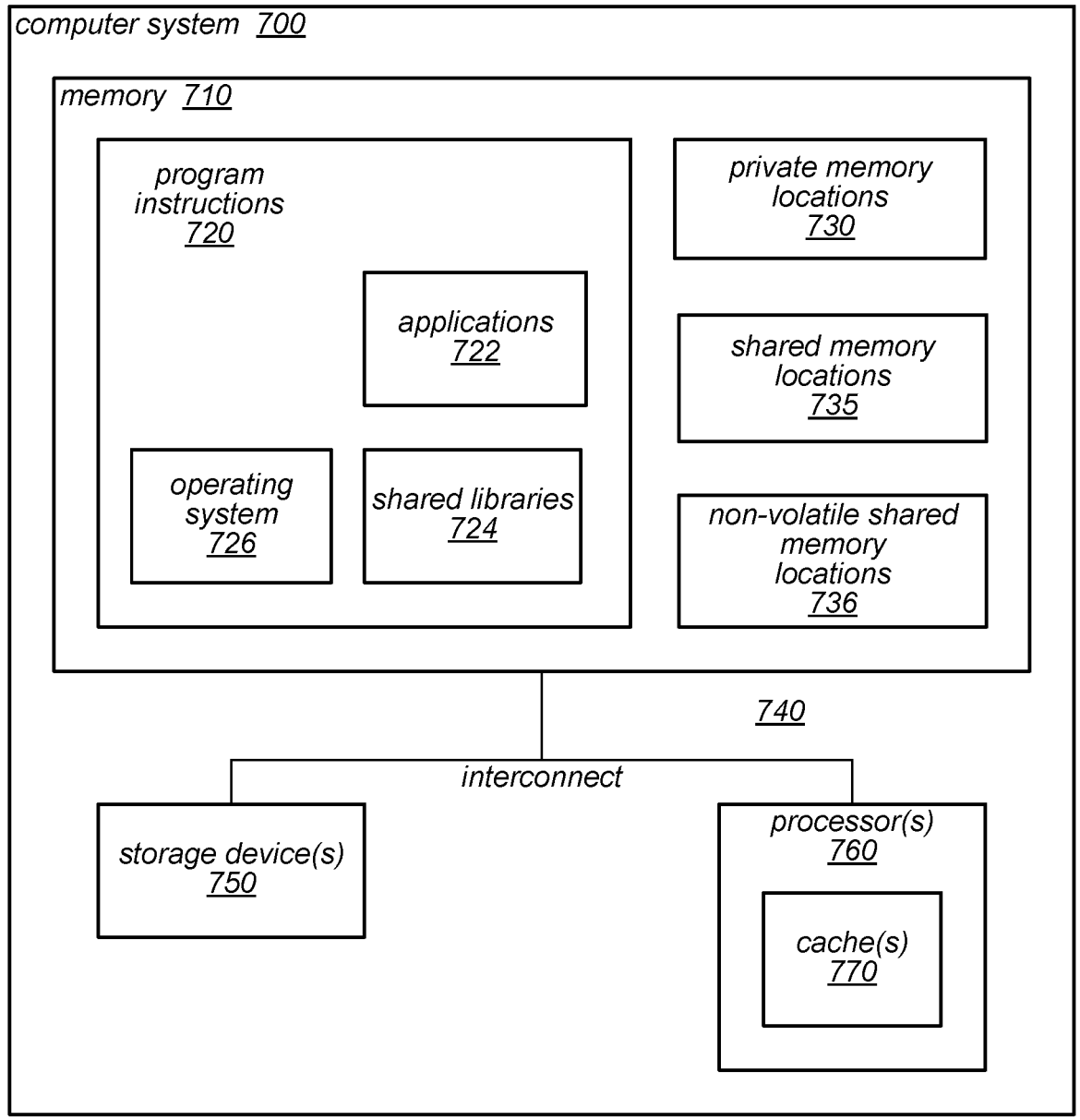
FIG. 7 is a block diagram illustrating one embodiment of a computing system that is configured to implement enhanced ticket lock operations, as described herein.

In various embodiments, computer system 700 may include one or more processors 760; each may include multiple cores, any of which may be single- or multi-threaded. For example, multiple processor cores may be included in a single processor chip (e.g., a single processor 760), and multiple processor chips may be included in computer system 700. Each of the processors 760 may include a cache or a hierarchy of caches 770, in various embodiments, for which the various aspects of the enhanced Ticket Lock operation may be tuned such as in step 430 of FIG. 4 and step 211 of FIG. 2. For example, each processor chip 760 may include multiple L1 caches (e.g., one per processor core) and one or more other caches (which may be shared by the processor cores on a single processor). The computer system 700 may also include one or more storage devices 750 (e.g. optical storage, magnetic storage, hard drive, tape drive, solid state memory, etc.) and one or more system memories 710 (e.g., one or more of cache, SRAM, DRAM, RDRAM, EDO RAM, DDR 10 RAM, SDRAM, Rambus RAM, EEPROM, etc.). In some embodiments, one or more of the storage device(s) 750 may be implemented as a module on a memory bus (e.g., on interconnect 740) that is similar in form and/or function to a single in-line memory module (SIMM) or to a dual in-line memory module (DIMM). Various embodiments may include fewer or additional components not illustrated in FIG. 7 (e.g., video cards, audio cards, additional network interfaces, peripheral devices, a network interface such as an ATM interface, an Ethernet interface, a Frame Relay interface, etc.)

The one or more processors 760, the storage device(s) 750, and the system memory 710 may be coupled to the system interconnect 740. One or more of the system memories 710 may contain application data 728 and program instructions 720. Application data 728 may contain various data structures to implement enhanced ticket locks while Program instructions 720 may be executable to implement one or more applications 722, shared libraries 724, and/or operating systems 726.

Program instructions 720 may be encoded in platform native binary, any interpreted language such as Java™ byte-code, or in any other language such as C/C++, the Java™ programming language, etc., or in any combination thereof. In various embodiments, applications 722, operating system 726, and/or shared libraries 724 may each be implemented in any of various programming languages or methods. For example, in one embodiment, operating system 726 may be based on the Java programming language, while in other embodiments it may be written using the C or C++ programming languages. Similarly, applications 722 may be written using the Java programming language, C, C++, or another programming language, according to various embodiments. Moreover, in some embodiments, applications 722, operating system 726, and/shared libraries 724 may not be implemented using the same programming language. For example, applications 722 may be C++ based, while shared libraries 724 may be developed using C.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein. It is intended that the following claims be interpreted to embrace all such variations and modifications.

In conclusion, multiple embodiments of an enhanced ticket lock are disclosed. With these enhancements, locking operations retain the advantages of classic ticket lock implementations, including low latency locking under low-contention conditions, while improving performance under high-contention conditions through improved transfer of ownership in the unlock path. Experimental results demonstrate that the enhanced ticket lock operation matches the performance of classic ticket locks, under conditions most favorable to classic ticket locks and in applications where ticket locks are traditionally preferred, while also meeting and often exceeding the performance of alternative locking approaches such as the MCS lock under high-contention conditions where the classic ticket lock traditionally suffers. For example, in a benchmark consisting of multiple threads executing a common critical section and contending for a single lock, the classic ticket lock, MCS lock and enhanced ticket lock exhibit similar performance for very low thread count. For increasing thread counts, the MCS lock exhibits higher latency and lower throughput but good scalability to very high thread counts while the classic ticket lock exhibits initially higher throughput but poor scalability and rapidly decline throughput at very high thread counts. In contrast, the enhanced ticket lock offers throughput significantly improved over the MCS lock and essentially matching the classic ticket lock while providing scalability equal to that of the MCS lock. For these reasons, the enhanced ticket lock provides significant performance advantages over traditional lock implementations.

What is claimed:

1. A method comprising:
    performing, by a thread of a plurality of threads executed on one or more processors, an operation to allocate a lock for exclusive access to a resource, comprising:
        selecting a location of a long term wait value different from a location of a grant value indicating a value of a ticket currently holding the lock;
        waiting for the long term wait value at the selected location to indicate that a contention condition for the thread has been met; and
        waiting, responsive to the contention condition being met, for the grant value to equal a value of a ticket held by the thread.

2. The method of claim 1, wherein the contention condition comprises a threshold for which a number of threads waiting to allocate the lock does not exceed.

3. The method of claim 1, the performing further comprising allocating the ticket held by the thread, the ticket representing a position for allocating the lock, prior to the selecting, the allocating comprising:
    executing an atomic fetch-and-add instruction on a next ticket field, wherein the atomic fetch-and-add instruction comprises atomically setting a value of the ticket to a value fetched from the next ticket field and subsequently incrementing the next ticket field.

4. The method of claim 3, the selecting the location of the long term wait value comprising selecting a location from a plurality of wait locations based at least in part on a result of a hash operation performed on the value of the allocated ticket.

5. The method of claim 4, wherein the one or more processors comprise one or more memory caches, and wherein the hash operation performed on the value of the allocated ticket comprises distributing consecutive values of tickets to respective wait locations associated with respective different cache lines.

6. The method of claim 1, the selecting the location of the long term wait value comprising selecting a long term grant location associated with the lock.

7. The method of claim 1, further comprising:
performing, by the thread of the plurality of threads executed on the one or more processors, an operation to release the lock for exclusive access to the resource, comprising incrementing the grant value.

8. One or more non-transitory computer-accessible storage media storing program instructions that when executed on or across one or more processors cause the one or more processors to perform:
executing, by a thread of a plurality of threads, an operation to allocate a lock for exclusive access to a resource, comprising:
selecting a location of a long term wait value different from a location of a grant value indicating a value of a ticket currently holding the lock;
waiting for the long term wait value at the selected location to indicate that a contention condition for the thread has been met; and
waiting, responsive to the contention condition being met, for the grant value to equal a value of a ticket held by the thread.

9. The one or more non-transitory computer-accessible storage media of claim 8, wherein the contention condition comprises a threshold for which a number of threads waiting to allocate the lock does not exceed.

10. The one or more non-transitory computer-accessible storage media of claim 8, the executing further comprising allocating the ticket held by the thread, the ticket representing a position for allocating the lock, prior to the selecting, the allocating comprising:
executing an atomic fetch-and-add instruction on a next ticket field, wherein the atomic fetch-and-add instruction comprises atomically setting a value of the ticket to a value fetched from the next ticket field and subsequently incrementing the next ticket field.

11. The one or more non-transitory computer-accessible storage media of claim 10, the selecting the location of the long term wait value comprising selecting a location from a plurality of wait locations based at least in part on a result of a hash operation performed on the value of the allocated ticket.

12. The one or more non-transitory computer-accessible storage media of claim 11, wherein the one or more processors comprise one or more memory caches, and wherein the hash operation performed on the value of the allocated ticket comprises distributing consecutive values of tickets to respective wait locations associated with respective different cache lines.

13. The one or more non-transitory computer-accessible storage media of claim 8, the selecting the location of the long term wait value comprising selecting a long term grant location associated with the lock.

14. The one or more non-transitory computer-accessible storage media of claim 8, the program instructions that when executed on or across one or more processors cause the one or more processors to further perform:
executing, by the thread of the plurality of threads, an operation to release the lock for exclusive access to the resource, comprising incrementing the grant value.

15. A system, comprising:
one or more processors and a memory, the memory comprising program instructions executable by the one or more processors to perform, by a thread of a plurality of threads, an operation to allocate a lock, the operation to allocate the lock configured to:
select a location of a long term wait value different from a location of a grant value indicating a value of a ticket currently holding the lock;
wait for the long term wait value at the selected location to indicate that a contention condition for the thread has been met; and
wait, responsive to the contention condition being met, for the grant value to equal a value of a ticket held by the thread.

16. The system of claim 15, wherein the contention condition comprises a threshold for which a number of threads waiting to allocate the lock does not exceed.

17. The system of claim 15, wherein the operation to allocate the lock is configured to allocate the ticket held by the thread, the ticket representing a position for allocating the lock, prior to the selecting, wherein to allocate the ticket the thread is configured to:
execute an atomic fetch-and-add instruction on a next ticket field, wherein the atomic fetch-and-add instruction comprises atomically setting a value of the ticket to a value fetched from the next ticket field and subsequently incrementing the next ticket field.

18. The system of claim 17, wherein to select the location of the long term wait value, the operation to allocate the lock configured to select a location from a plurality of wait locations based at least in part on a result of a hash operation performed on the value of the allocated ticket.

19. The system of claim 18, wherein the one or more processors comprise one or more memory caches, and wherein the hash operation is configured to distribute consecutive values of tickets to respective wait locations associated with respective different cache lines.

20. The system of claim 15, wherein to select the location of the long term wait value, the operation to allocate the lock configured to select a long term grant location associated with the lock.

* * * * *